F. W. HALL.
COIN COLLECTING MEANS FOR TELEPHONE SERVICES.
APPLICATION FILED MAY 26, 1920.
1,364,630.
Patented Jan. 4, 1921.
2 SHEETS—SHEET 1.
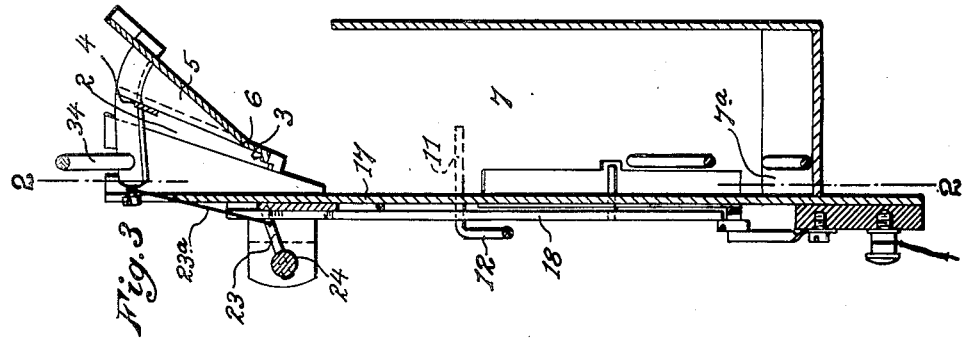
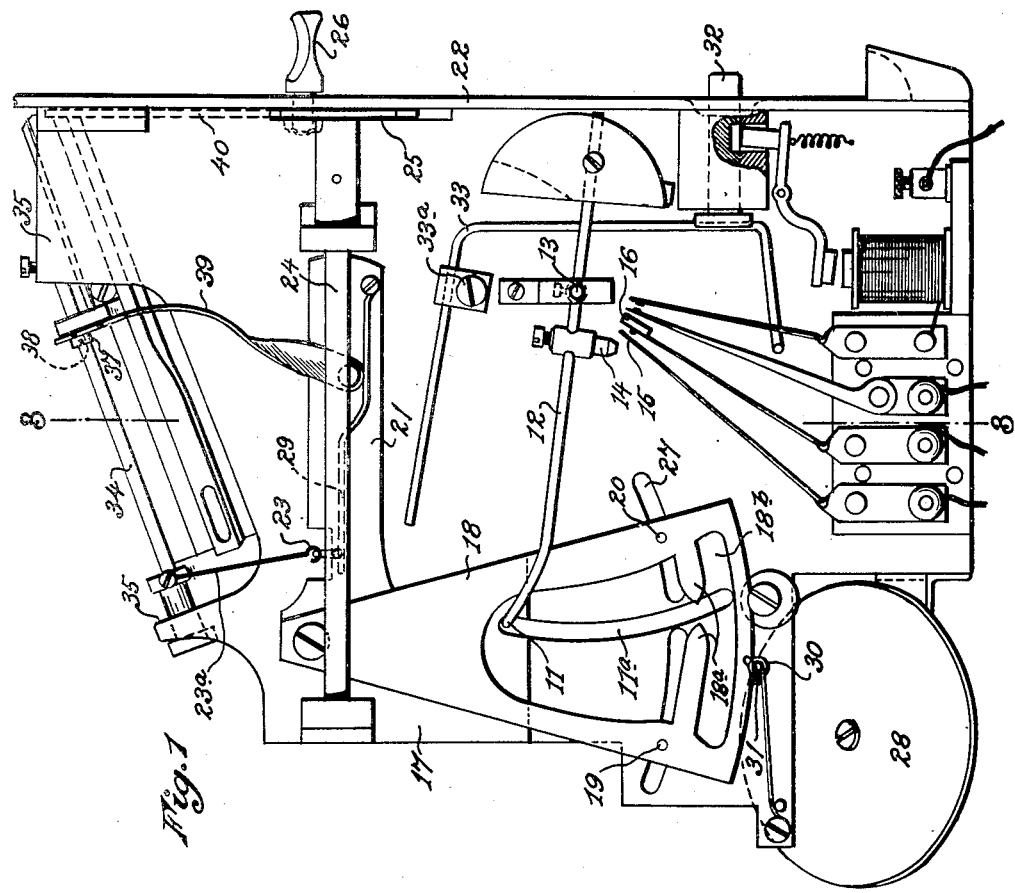
Inventor:
Frederick William Hall.
Attorney;

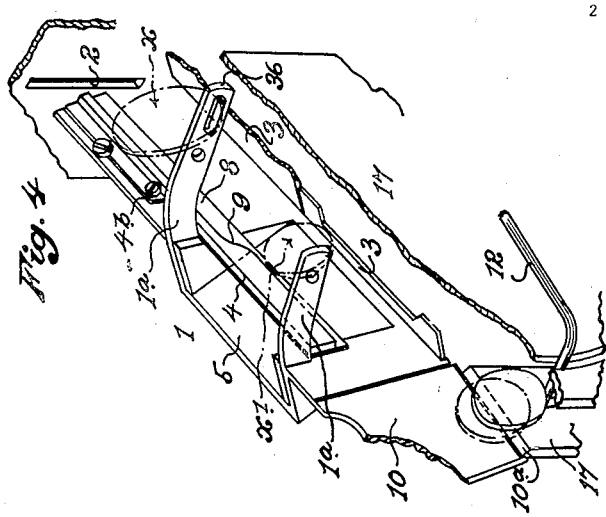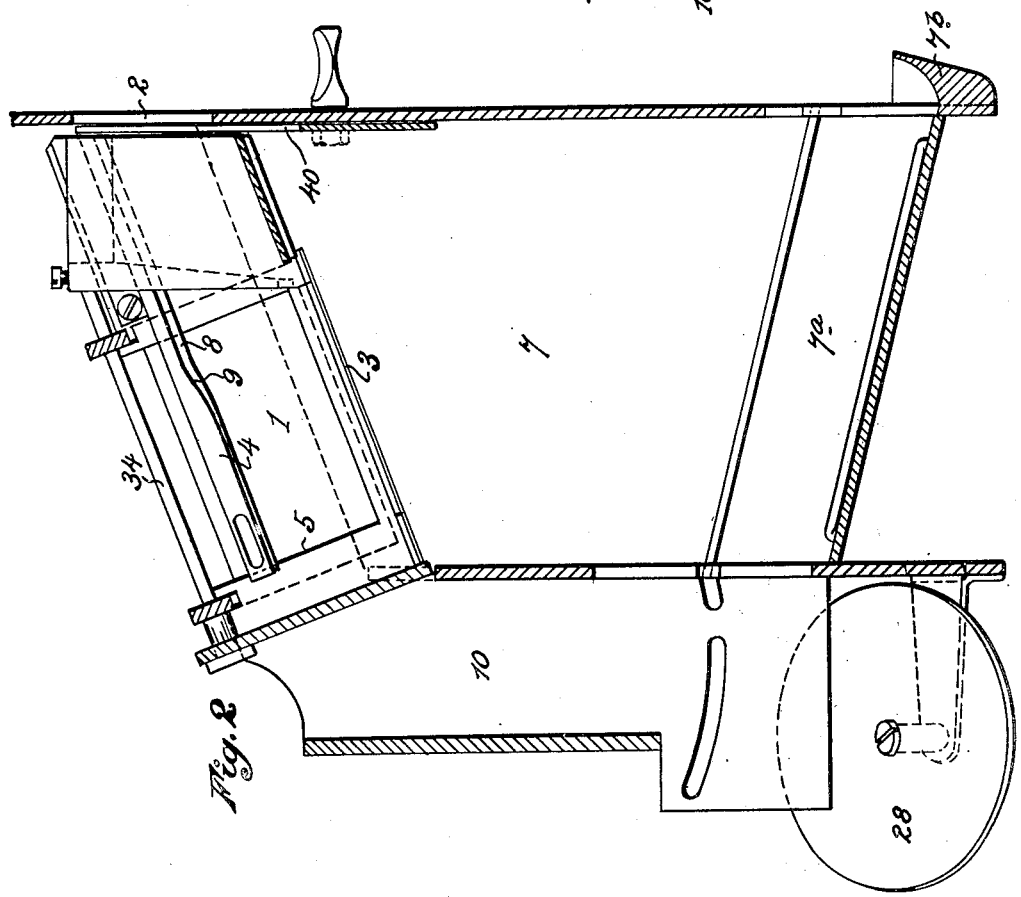

UNITED STATES PATENT OFFICE.

FREDERICK WILLIAM HALL, OF LONDON, ENGLAND.

COIN-COLLECTING MEANS FOR TELEPHONE SERVICES.

1,364,630.  Specification of Letters Patent.  Patented Jan. 4, 1921.

Original application filed July 8, 1918, Serial No. 309,526. Divided and this application filed May 26, 1920. Serial No. 384,315.

*To all whom it may concern:*

Be it known that I, FREDERICK WILLIAM HALL, a subject of the King of England, and a resident of London, England, engineer, have invented certain new and useful Improvements in Coin-Collecting Means for Telephone Services, of which the following is a specification.

This invention relates to coin collecting means for telephone services which will only permit communications between users after correct payment has been deposited in the box, and in which means are provided under the control of the caller by which the money can either be deposited into the cash receptacle and a signal given, or returned to the caller in the event of the line being engaged or out of order, the present application being a division of an application filed July 8, 1918, Serial No. 309,526.

The invention involves the use of a balance for the coins inserted and a rocking member coöperating therewith to receive the coins from the balance and under the control of the caller whereby it may be rocked in one or other direction to deliver the coins either to the cash receptacle or to be returned to the caller.

The invention comprises a novel form of rocking member having means for giving spring action thereto in both directions to insure a complete movement thereof for frustrating attempts to operate the apparatus by means of coins of a smaller denomination than those intended, should such coins reach the balance and also should such coins form part of a determined sum necessary to pay for a call and involving the payment also of larger coins such as would be the case when the payment may be in the form of one or more coins which may be of one or more denominations for which the mechanism of the present invention is especially adapted. The rocking member is also provided within same with abutments between which the coins are deposited by the balance when the latter descends under the action of the coin or coins, the balance arm also coöperating with the rocking member in such a manner that the coin or coins cannot be passed to the cash receptacle until the balance has been properly depressed. The rocking member may also coöperate with a rocking coin chute so that the latter acts as a counterpoise to return said rocking member to normal central position from one direction of its movement, the rocking member having an integral element acting as a counterpoise to return it from its other direction of movement, and said chute may be of such a character as to detect or test the coins admitted so as to pass only those intended to operate the mechanism.

The invention also comprises certain details of construction and combinations of parts as hereinafter fully described and specifically pointed out in appended claims with reference to the accompanying drawings wherein:—

Figure 1 is a side elevation of the mechanism within the call box showing the same in its position of rest.

Fig. 2 is a sectional view after removal of the face plate shown in Fig. 1 and the parts in front thereof, and illustrating more particularly the coin chutes.

Fig. 3 is a cross section on line 3—3 of Fig. 1.

Fig. 4 is a detail view of the chute and appurtenant parts on an enlarged scale.

In the invention as illustrated, an angularly disposed coin chute 1 is placed behind a coin-entering slot 2. The chute is formed with a fixed rail 3 along one edge, such as the lower, and a movable rail 4 pivoted at $4^b$ along the opposite edge, such as the upper edge. A section 5 of the chute is recessed or off-set behind the rails 3, 4, and so formed that, should a coin be unsupported by the upper rail 4, it will fall and rock about a fulcrum 6 formed in the recessed section 5, in such a way that its lower edge will be carried clear from the lower rail 3 and it will fall into a chamber 7 to be returned to the caller by means of the chute $7^a$ and cup $7^b$ outside the casing or otherwise dealt with as desired. The face of the upper rail 4 is recessed as at 8, said recess ending in a shoulder 9 so placed that certain coins such as pennies will pass along the whole face of the rail unimpeded as at $x$, Fig. 4, while others of smaller size such as florins will run in the recess 8 and will strike the abutment 9 and by so doing lift the rail about its pivot $4^b$, thereby causing it to cease supporting the coin, whereupon the coin will fall into the recessed portion 5 and thence to chamber 7. Other coins, such as halfpennies, will run along the lower edge of the rail unimpeded, as at $x^1$, while still other coins of yet smaller size, such as six-pences, will fall below the rail 4 and also be rejected by falling as described.

The machine may thus be capable of operation by coins of different denominations, such as pennies and half-pennies, the former running along and being supported by the face of rail 4 and the half-pennies running along and being supported by the rail portion 8 without contacting with the abutment 9. Coins of a diameter between pennies and half-pennies will, however, engage abutment 9 and throw up the rail, while coins of smaller diameter than a half-penny will not be supported at all and fall straightway into chamber 7.

Coins passing the tests imposed by the mechanism just described are conducted to a vertical chute 10 where they are deposited on the bent end 11 of a counterpoised balance arm 12 pivoted at 13 and when the correct number of coins has been so deposited (in the event of more than one coin being required to render the apparatus operative) this arm 12 is swung down by the weight of the coin or coins and makes an electrical connection by the stud 14 pressing the leaf-spring 15 against the leaf-spring 16, as described in pending application No. 309526.

The inner wall of the vertical chute 10 where it joins the inclined chute 1 may be stepped slightly with relation to the end of said inclined chute as at 10ª above the balance 12 and the coin when on the balance is slightly above the lower rail 3 of chute 1 so that each successive coin to the number necessary to depress the balance 12 arrives at the side of or behind the previous coin and not on top thereof, as indicated in Fig. 4.

Pivoted to the plate 17 which forms one side of the vertical chute 10 is a member, which may be in the form of a quadrant 18 provided with two pins or other form of abutment 19, 20, which are so placed that when the balance arm descends under the action of the coins, the latter come to rest between said pins or abutments.

The bent end 11 above mentioned passes through and is guided by a slot 11ª in the plate 17. The coin as it depresses said bent end cannot be discharged into the cash receptacle by the pin 20 on the quadrant until said balance arm is fully depressed and has passed the fingers 18ª on the quadrant and come into the slotted portion 18ᵇ thereof for the reason that until this position is reached the coin will be prevented from being discharged from the chute 10 by the pin 20 owing to its being obstructed by the outer wall of the chute (Fig. 2). Discharge of the coin into the chamber 7 and along the returned money chute 7ª to the cup 7ᵇ may be permitted before the aforesaid position is reached.

The quadrant member 18 is provided with an extended projection or lever 21, which can be passed through the front plate 22 or other part of the apparatus to a position under the control of the caller, but preferably as illustrated, it is adapted to be operated by an arm 23 on a rock shaft 24 having also an arm 25 carrying a handle 26 projecting through a slot in the front plate. The said quadrant 18 and its lever are kept in a central position by means such as a counterpoise, as hereinafter described. The caller by depressing the handle 26 will cause the quadrant to rock to the left of the position shown in Fig. 1, whereupon the pin 20 projecting from the quadrant through the slot 27, acting on the coin or coins will cause it or them to enter or fall into the cash receptacle.

The coins in passing to the cash receptacle fall on a sounder 28 which being audible at the exchange gives the signal that they have passed in this direction.

It will be seen that the arm 23 in the course of its movement first arrives against a spring 29, which is attached to the lever 21 and that after it has brought this spring into tension, it arrives against and moves the lever 21. To insure a complete movement of the quadrant 18 taking place, the quadrant is retained in its central position as by a spring catch 30 engaging a rounded recess 31 in the quadrant. The tension given to the spring arm 29 causes the quadrant when forced out of engagement with the spring catch 30 to make a complete movement.

In order to move the quadrant 18 in the other direction from the normal in order to return the deposited coins to the caller instead of passing them to the cash receptacle as above described, a push button 32 may be operated by the caller to rock a lever 33 which abuts against and raises the lever arm 21 of the quadrant. The lever 33 is pivoted at 33ª and is formed of spring wire so as to be resilient in order that the quadrant may be given a complete stroke by the tension of the lever 33 when the quadrant has freed itself from the spring catch 30.

The chute 1 may be used as a counterpoise to return the quadrant 18 to its central position from one direction of movement and the quadrant itself by being weighted by its lever arm 21 will similarly return from the other direction. In the event of so using the chute 1 as a counterpoise, arms 1ª of the chute are carried by a rock shaft 34 mounted in lugs 35, 35, on the frame. The upper chute arm 1ª carries an extension 36 connected by pin 37 and slot 38 to a link 39 connected to lever arm 21 of the quadrant 18. The slot 38 permits of free movement of the lever arm 21 when the quadrant is moved in the contrary direction to return the coins to the caller.

I may also provide a link 23ª between the lower arm 1ª of the chute and the arm 23 on the rock-shaft 24 so that when the latter is rocked by the handle 26 as above described the chute is also rocked with the rock-shaft 34, the load of the chute being thus upon the shaft 24 and arm 23 thereby relieving the arm 21 of said load and allowing the quadrant freedom of initial movement: said quadrant is, however, returned to central position by the weight of the chute and arm 21 as described.

The rocking movement given to the chute serves to clear it of any dirt that may have fallen into it. A projecting sweeper 40 connected to the arm 25 of the operating handle 26 also serves to lock the handle 26 against movement, should a coin be inserted attached to a wire, or any other obstruction be present in the coin slot.

In the operation of the mechanism described, the money is first placed in the slot, either $1^d$, $1\tfrac{1}{2}^d$, $2^d$, $2\tfrac{1}{2}^d$, etc., as may be decided upon. When the correct number of coins have been so deposited, the balance arm will rock and give an electrical signal to the telephone exchange that a caller is on the line. Should the subscriber's number demanded be free, then a movement given to a handle 26 ejects the money over the sounder 28 into the cash receptacle, indicating to the exchange that the call has been paid for.

On the other hand, if the number asked for is engaged, or if the caller gets no response from the exchange on account of the line or telephone instrument being out of order, then by pushing the button 32, the money is returned to the caller.

From the above description it will be seen that instead of using two levers with their respective handle and button to produce the two different operations mentioned, if the lever 21 connected to the quadrant 18 be extended through the front plate 22, then movement thereof in one direction will produce one effect, and a movement in the other direction will produce the other effect.

What I claim as my invention and desire to secure by Letters Patent of the United States is:—

1. In a coin collector for telephone services, the combination of a coin receiving balance, a rocker coöperating therewith and adapted for movement in opposite directions under control of the operator for discharge of the coin to a cash receptacle or return to the operator, and means for imparting spring action to said rocker in both directions to insure complete movement thereof.

2. In a coin collector for telephone services, the combination of a cash receptacle, a chute to return coins to the operator, a coin-receiving balance, a rocker member associated therewith, said rocker member being movable in opposite directions under the control of the operator for forcing the coin from the coin-receiving balance to the cash receptacle or to the return chute, and means for preventing the coin from being discharged to the cash receptacle from the coin receiving balance by the rocker member until the coin-receiving balance has been fully depressed by the coin.

3. In a coin collector for telephone services, the combination of a coin receiving balance and a rocker coöperating therewith and adapted for movement in opposite directions, an element integral with the rocker to return it to normal position from one direction of movement and another element separate from the rocker and serving as a counterpoise to return it to normal from the other direction of movement.

4. In a coin collector for telephone services the combination of a coin receiving balance and a rocker coöperating therewith and adapted for movement in opposite directions, an element integral with the rocker to return it to normal position from one direction of movement, and a rocking coin chute adapted to deliver coins to said balance and serving as a counterpoise to return it to normal from the other direction of movement.

5. In a coin collector for telephone services the combination of a coin receiving balance and a rocker coöperating therewith and adapted for movement in opposite directions, an element integral with the rocker to return it to normal position from one direction of movement, a rocking coin chute adapted to deliver coins to said balance and serving as a counterpoise to return it to normal from the other direction of movement and connections between the chute and rocker whereby movement of the rocker in one direction will rock the coin chute.

6. In a coin collector for telephone services, the combination of a coin receiving balance and a rocker coöperating therewith, a chute adapted to convey coins of one or more denominations to said balance and rocker, and stepped portions in said chute adjacent the balance whereby successive coins will assume positions at the side of or behind previously inserted coins.

In witness whereof I have signed this specification.

FREDERICK WILLIAM HALL.